United States Patent [19]
Tsukamoto et al.

[11] Patent Number: 5,558,599
[45] Date of Patent: Sep. 24, 1996

[54] DRIVE TO NEUTRAL SHIFT CONTROL SYSTEM

[75] Inventors: Kazumasa Tsukamoto, Toyota; Masahiro Hayabuchi; Masaaki Nishida, both of Anjo; Yoshihisa Yamamoto, Nishio; Muneo Kusafuka, Anjo; Kazuhiro Mikami, Kariya; Hiroshi Tsutsui, Nishio, all of Japan

[73] Assignee: Aisin AW Co., Ltd., Japan

[21] Appl. No.: 431,074

[22] Filed: Apr. 27, 1995

[30] Foreign Application Priority Data

May 2, 1994 [JP] Japan ................................. 6-093591

[51] Int. Cl.⁶ .................................................. F16H 61/18
[52] U.S. Cl. ........................................... 477/116; 477/117
[58] Field of Search ..................................... 477/115, 116, 477/117, 166, 174, 175

[56] References Cited

U.S. PATENT DOCUMENTS 4,850,251  7/1989  Kuwayama et al. ................. 477/116
5,090,270  2/1992  Suzuki et al. ........................ 477/116

Primary Examiner—Khoi Q. Ta
Attorney, Agent, or Firm—Lorusso & Loud

[57] ABSTRACT

A control system for an automatic transmission, which receives the rotation of the engine through a fluid coupling, and which has a clutch applied when a forward running range is selected and released when a neutral range is selected and a range selecting mechanism for selecting a range. The control system includes a range detector for detecting the selected range, a hydraulic circuit and a control unit. The hydraulic circuit includes a hydraulic servo which is fed an oil pressure for applying the clutch and a manual valve movable between at least a forward range position for generating a forward range oil pressure and a neutral range position, by operation of the range selecting mechanism. A regulator valve regulates the forward range oil pressure to generate a regulated oil pressure. A solenoid valve is turned ON/OFF by the control unit to generate a signal oil pressure for switching a change-over valve between a first position feeding the forward range oil pressure to the hydraulic servo and a second position feeding the regulated oil pressure to the hydraulic servo. The control unit delays output of the signal solenoid valve, if a switching from the forward running range to the neutral range is detected by the range detector, so that the change-over valve remains in the second position until lapse of a set time period, and is then moved to a first position after the set time period has elapsed.

7 Claims, 10 Drawing Sheets

|   |       | Solenoid |    |    | Clutch |    |    | Brake |    |    |    | One-way Clutch |    |    |
|---|-------|----|----|----|----|----|----|----|----|----|----|----|----|----|
|   |       | S1 | S2 | S3 | C1 | C2 | C3 | B1 | B2 | B3 | B4 | F1 | F2 | F3 |
|   | R     | ×  | ○  | ×  | ×  | ○  | ×  | ×  | ×  | ○  | ○  | ×  | ×  | ×  |
|   | N     | ×  | ○  | ×  | ×  | ×  | ×  | ×  | ×  | ×  | ○  | ×  | ×  | ×  |
| D | 1 ST  | ×  | ○  | △  | ○  | ×  | ×  | ×  | ×  | (○)| ○  | ×  | ○  | ○  |
| D | 2 ND  | ○  | ○  | △  | ○  | ×  | ×  | ○  | ○  | ×  | ○  | ○  | ×  | ○  |
| D | 3 RD  | ○  | ×  | ×  | ○  | ×  | ○  | ○  | ○  | ×  | ×  | ○  | ×  | ×  |
| D | 4 TH  | ×  | ×  | ×  | ○  | ○  | ○  | ×  | ○  | ×  | ×  | ×  | ×  | ×  |

FIG. 3

DRIVE TO NEUTRAL SHIFT CONTROL SYSTEM

BACKGROUND OF THE INVENTION

1. Field of the Invention

The present invention relates to a control system for an automatic transmission.

2. Related Art

The automatic transmission of the prior art is equipped with a torque converter acting as a fluid coupling for receiving the rotation generated by an engine, and a transmission for changing the speed of the rotation transmitted from the torque converter. The transmission is equipped with a planetary gear unit composed of a plurality of gear elements for effecting the shifting in accordance with a shift pattern which is preset to correspond to the vehicle speed, the throttle opening and so on.

The automatic transmission allows for selection of a (parking) P-range, a (reverse) R-range, a (neutral) N-range, a (drive) D-range, a (second) S-range, a (low) L-range and so on. If the N-range is switched to the D-range by operation of the shift lever, for example, the rotation of the engine at idling is transmitted through the torque converter to the transmission, to cause a "creep phenomenon" in which the vehicle will advance little by little without any depression of the accelerator pedal.

When a range such as the D-range, the S-range or the L-range (hereinafter a "forward range") for running the vehicle forward is selected, a determination of satisfaction of the following conditions is made: (1) that the accelerator pedal is released, (2) that the brake pedal is depressed and (3) that the vehicle speed is substantially "0". If these conditions are found to be satisfied, the forward clutch which is applied in a forward range (hereinafter "first clutch"), is released or brought into slipping engagement to establish a pseudo-neutral state (hereinafter "neutral control state") so that the aforementioned creep phenomenon may be prevented (as disclosed in U.S. Pat. No. 4,850,251).

The pressure of the oil fed to the hydraulic servo of the first clutch is controlled by a linear solenoid valve which generates a control pressure for actuation of a regulator valve which, in turn, generates a regulated oil pressure. A change-over valve selectively feeds either the regulated oil pressure or the D-range pressure to the hydraulic servo.

In the aforementioned control system of the prior art, the oil pressure fed to the hydraulic servo of the first clutch can be adjusted to smooth the engagement of the first clutch when the range is switched from the N-range to the D-range (or forward range). However, when the regulated oil pressure or the D-range pressure is selected and fed to the hydraulic servo by the change-over valve, shock in engagement of the first clutch may occur in switching from the N-range to the D-range, responsive to operation of the shift lever. Specifically, at the time of switching from the N-range to the D-range (hereinafter "N-D switching"), the manual valve is switched by the operation of the shift lever to generate the D-range pressure. Then, the D-range pressure is regulated by a regulator valve to generate a regulated oil pressure, and the change-over valve is switched to feed the regulated oil pressure to the hydraulic servo so that the first clutch can be smoothly applied.

If the switching of the change-over valve is delayed in the above described operation, the D-range pressure is temporarily fed through the change-over valve to the hydraulic servo, which is designed to have a stroke loss so that no influence is effected by receipt of the D-range pressure. However, if the aforementioned N-D switching is effected immediately after switching from the D-range to the N-range, the oil at the time of selecting the D-range remains in the hydraulic servo at that N-D switching time. If, therefore, the D-range pressure is temporarily fed to the hydraulic servo through the change-over valve, due to a delay in the switching of the change-over valve, the oil pressure in the hydraulic servo prematurely rises to cause a serious engaging shock.

FIG. 13 is a graph of oil pressure in the first clutch and torque (vertical axis) versus time (horizontal axis) in the control system for an automatic transmission of the prior art. As seen in FIG. 13, if the N-D switching is effected immediately after switching from the D-range to the N-range (hereinafter "D-N switching"), the oil pressure P in the hydraulic servo of the first clutch temporarily rises, so that the torque T abruptly rises to cause engaging shock.

The foregoing suggests the possibility of keeping the change-over valve switched to the regulated oil pressure selecting side, even when the N-range is selected by the shift lever. If such a design were adopted, even with D-range pressure generated in N-D switching, because the change-over valve would be switched to the regulated oil pressure selecting side, the hydraulic servo would receive the regulated oil pressure and engaging shock would be avoided. However, since a solenoid valve is used for switching the change-over valve, this solenoid valve would be turned ON and energized, not only while the pseudo-neutral state is established, but also when the N-range is selected. As a result, the power consumption would increase and, still worse, the solenoid would generate heat, shortening its useful life.

SUMMARY OF THE INVENTION

An object of the present invention is to solve the aforementioned problems of the prior art control system and to provide an improved control system for an automatic transmission, which improved control system prolongs the useful service life of the solenoid valve, by minimizing its "ON" period and heat generation, and which is free of engaging shock even when N-D switching is effected immediately after a D-N switch.

According to one aspect of the present invention, there is provided a control system for an automatic transmission in a vehicle drive train, which includes a fluid coupling for transmitting the rotation of an engine to the transmission, a clutch within the transmission, which is applied responsive to selection of a forward running range and which is released when a neutral range is selected, range selecting means for selecting a range, range detecting means for detecting the selected range, a hydraulic control circuit and a control unit.

When the driver operates the range selecting means to select a range, this selected range is detected by the range detecting means. When a forward running range is selected, the rotation of the engine is transmitted through the fluid coupling and the clutch to the transmission. When the neutral range is selected, the rotation of the engine is transmitted to the fluid coupling but not to the transmission.

The hydraulic control circuit includes: a hydraulic servo for applying the clutch responsive to oil pressure; a manual valve having at least a forward range position for generating a forward range oil pressure and a neutral range position; a regulator valve for regulating the forward range oil pressure to generate a regulated oil pressure; a solenoid valve, turned ON/OFF by the control unit, for generating a signal oil pressure; and a change-over valve which is switched, in response to the signal oil pressure, between a first position in which it feeds the forward range oil pressure to the hydraulic servo and a second position in which it feeds the regulated oil pressure to the hydraulic servo.

Moreover, the control unit includes delay means for outputting, responsive to a switching from the forward running range to the neutral range detected by the range detecting means, signals to the solenoid valve to position the change-over valve in the second position until lapse of a set time period, and then to move the change-over valve to its first position when the set time period has elapsed.

According to another aspect of the present invention, the change-over valve takes the first position, if the solenoid valve is ON, and the second position if OFF.

According to another aspect of the present invention, the control system further comprises hydraulic servo rotation deciding means for determining the rotational speed of the hydraulic servo. Moreover, the hydraulic servo has a check valve, and the control unit further includes delay inhibiting for inhibiting operation (delay) of the delay means if it is decided that the rotational speed of the hydraulic servo is sufficient to open the check valve.

When the R.P.M. of the hydraulic servo rises, the check valve is opened by the centrifugal force to abruptly discharge oil from the hydraulic servo so that the amount of oil remaining in the hydraulic servo is accordingly reduced. As a result, the engaging shock is not generated even if operation (the delay) of the delay means is inhibited. As a result, the solenoid valve can be turned OFF to reduce the power consumption and heat generation, thereby improving its durability.

In accordance with the present invention, when the driver operates the range selecting means to select a forward range, thereby placing the manual valve in the forward range position, forward range oil pressure is generated and is regulated by the regulator valve to produce the regulated oil pressure. Moreover, the solenoid valve is turned ON/OFF by the control unit so that the signal oil pressure is generated by the solenoid valve. If the change-over valve is placed in the first position by the signal oil pressure, the forward range oil pressure is fed to the hydraulic servo, but on the other hand, if the change-over valve is placed in the second position by the signal oil pressure, the regulated oil pressure is fed to the hydraulic servo.

When switching from the forward running range to the neutral range is detected by the range detecting means the delay means outputs a signal to the solenoid valve to move the change-over valve to its second position until the set time period has elapsed, and to the first position when the set time period has elapsed. As a result, the discharge of the oil from the hydraulic servo can be substantially completed before the change-over valve is placed in its first position.

Even if, in this case, N-D switching is effected immediately after D-N switching, the change-over valve is placed in the second position in accordance with the D-N switching so that oil at the forward range pressure is not fed to the hydraulic servo. As a result, the engaging shock can be prevented and the clutch smoothly applied.

Thus, in the present invention, the solenoid valve is OFF (or non-conductive) except while the regulated oil pressure is fed to the hydraulic servo. Moreover, with selection of the neutral range the solenoid valve is also OFF (or non-conductive) after lapse of the set time period. As a result, power consumption is reduced, and heat generation by the solenoid valve can be minimized to prolong the service life of the solenoid valve.

BRIEF DESCRIPTION OF THE DRAWINGS

FIG. 3 is a chart showing the operations of an automatic transmission under control of a control system according to an embodiment of the present invention;

DESCRIPTION OF THE PREFERRED EMBODIMENT

An embodiment of the present invention will now be described in detail with reference to the accompanying drawings.

Figure 1:
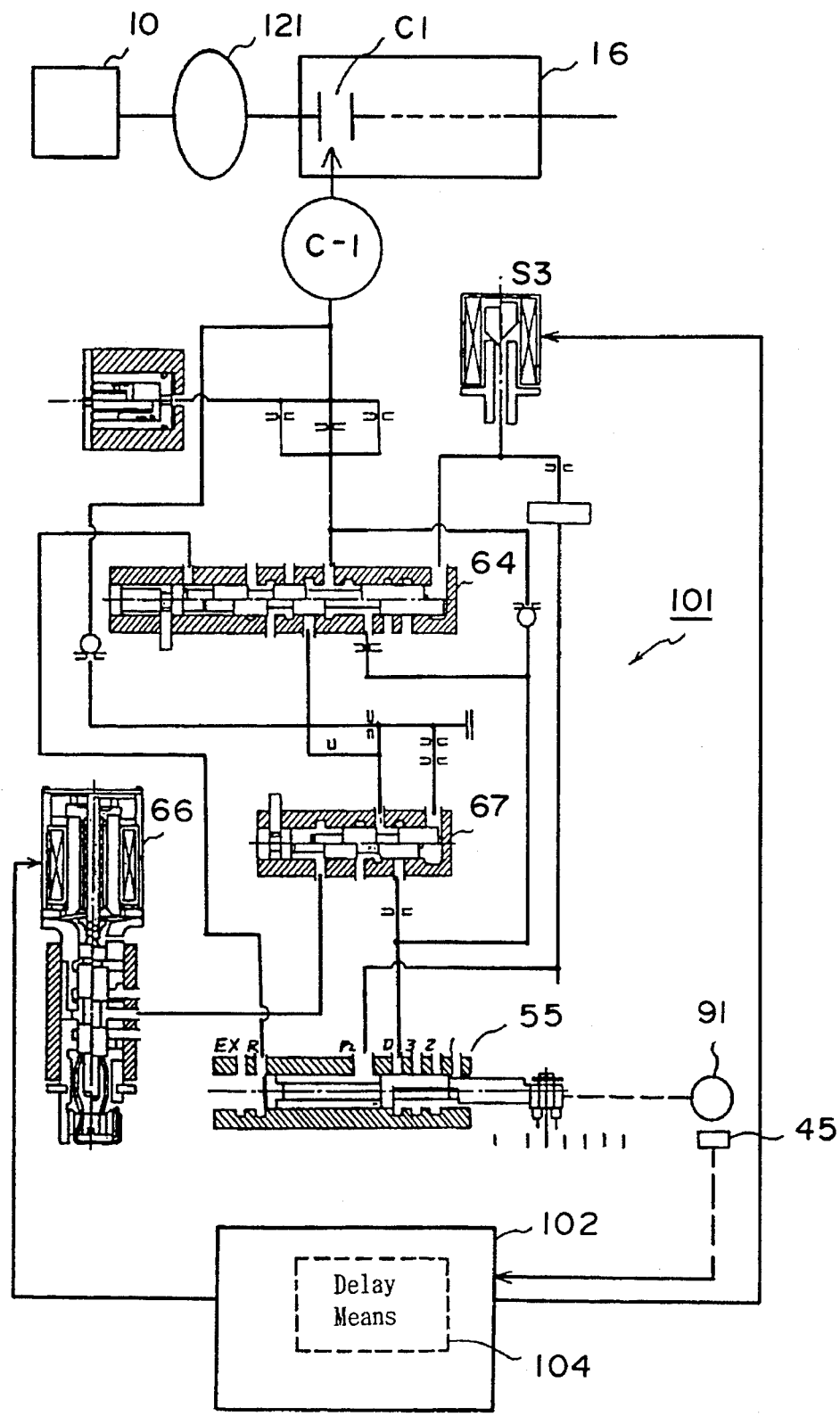
FIG. 1 is a block diagram showing a control system according to one embodiment of the present invention.

As shown in FIG. 1, the control system includes a fluid coupling 121 for transmitting the rotation of an engine 10 to a transmission 16; a first clutch C1 which is applied, when a forward running range is selected, and released when a neutral range is selected; a shift lever 91 serving as range selecting means for selecting a range; a neutral start switch (N.S.S.W.) acting as range detecting means for detecting the selected range; a hydraulic circuit 101; and a control unit 102.

The hydraulic circuit 101 is composed of: a hydraulic servo C-1 which receives an oil pressure for applying the first clutch C1; a manual valve 55 having at least a forward range position and a neutral range position, positioned by operation of the shift lever 91 and generating a forward range oil pressure in the forward range position; a C-1 control valve 67 acting as a regulator valve for adjusting the forward range oil pressure, in accordance with a control oil pressure from linear solenoid valve 66, to generate a regulated oil pressure; a third solenoid valve S3 turned ON/OFF by the control unit 102 for generating a signal oil pressure; and a neutral relay valve 64 adapted to be switched in response to the signal oil pressure and acting as a change-over valve for movement between a first position for feeding the forward range oil pressure to the hydraulic servo C-1 and a second position for feeding the regulated oil pressure to the hydraulic servo C-1.

The control unit 102 is equipped with delay means 104, responsive to selection of the neutral range, to position the neutral relay valve 64 in the second position until lapse of a set time period and in the first position when the set time period has elapsed. Reference numeral 66 designates the linear solenoid valve.

Figure 2:
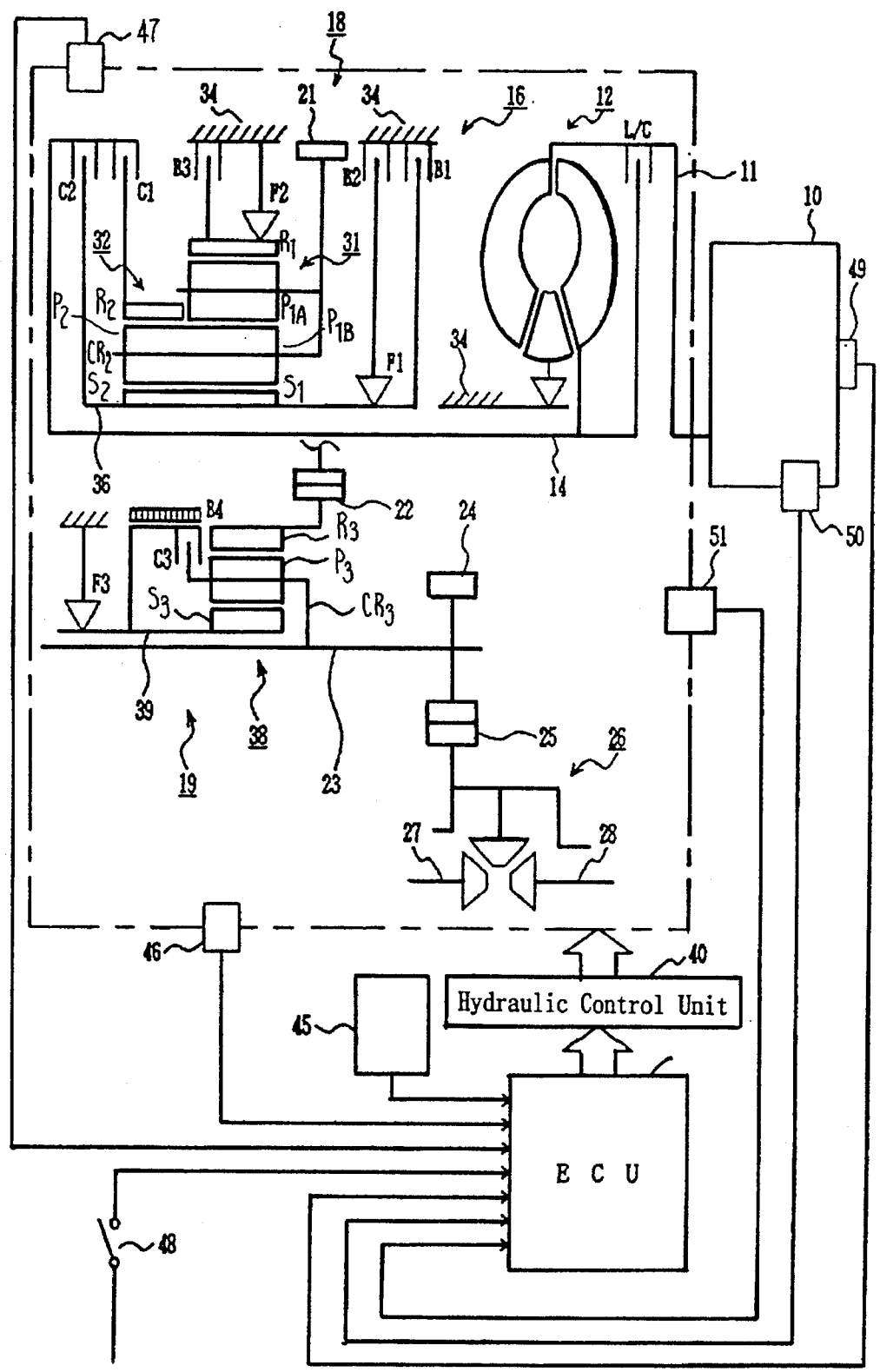
FIG. 2 is a schematic diagram showing an automatic transmission in combination with an embodiment of the control system of the present invention.

As shown in FIG. 2, the rotation generated by the engine 10 is transmitted through an output shaft 11 to a torque converter 12 acting as the fluid coupling 121 (of FIG. 1). This torque converter 12 transmits the rotation of the engine 10 through a working fluid to an output shaft 14 but is also able to transmit the rotation of the engine 10 directly to the output shaft 14 by a lockup clutch L/C which is applied when the vehicle speed v exceeds a set value.

Transmission 16, connected to the output shaft 14, can establish any one of four forward and one reverse speeds. This transmission 16 includes a main transmission 18 for effecting three forward speeds and one reverse speed, and an auxiliary transmission 19 of the under-drive type. Thus, the rotation of the main transmission 18 is transmitted through a counter drive gear 21 and a counter driven gear 22 to the auxiliary transmission 19, the output shaft 23 of which, in turn, transmits rotation through an output gear 24 and a ring gear 25 to a differential unit 26.

In this differential unit 26, the rotation received through the output gear 24 is differentiated so that the different rotational speeds are transmitted to the drive wheels (not shown) through left-hand and right-hand drive shafts 27 and 28.

The main transmission 18 is equipped, not only with a first planetary gear unit 31 and a second planetary gear unit 32, but also with first and second clutches C1 and C2, first, second and third brakes B1, B2 and B3, and first and second one-way clutches F1 and F2, all for selectively transmitting the torque between the individual elements of the two planetary gear units 31 and 32. Incidentally, the first clutch C1 corresponds to the clutch C of FIG. 1.

The first planetary gear unit 31 is composed of: a ring gear $R_1$ connected to a drive unit casing 34 through the third brake B3 and the second one-way clutch F2 which are juxtaposed to each other; a sun gear $S_1$ formed on a sun gear shaft 36 which is fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The aforementioned sun gear shaft 36 is connected through the second clutch C2 to the output shaft 14. Moreover, the sun gear shaft 36 is connected to the drive unit casing 34 through the first brake B1 and through the first one-way clutch F1 and the second brake B2 which are juxtaposed to each other.

On the other hand, the second planetary gear unit 32 is composed of: a ring gear $R_2$ connected through a first clutch C1 to the output shaft 14; a sun gear S2 formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$ and formed integrally with the pinion $P_{1B}$.

The aforementioned counter drive gear 21 meshes with the counter driven gear 22, which is arranged in the auxiliary transmission 19, to transmit the rotation of the main transmission 18, to the auxiliary transmission 19.

This auxiliary transmission 19 includes a third planetary gear unit 38. The auxiliary transmission 19 also has a third clutch C3, a fourth brake B4 and a third one-way clutch F3, all for selectively transmitting the torque between the individual elements of the third planetary gear unit 38.

This third planetary gear unit 38 is composed of: a ring gear $R_3$ connected to the counter driven gear 22; a sun gear $S_3$ formed on a sun gear shaft 39 which is rotatably fitted on the output shaft 23; a carrier $CR_3$ fixed on the output shaft 23; and a pinion P3 meshing between the ring gear $R_3$ and the sun gear $S_3$ and rotatably supported by the carrier $CR_3$.

Next will be described the operations of the automatic transmission thus constructed.

In FIG. 3, S1 is the first solenoid valve, S2 is the second solenoid valve, S3 is the third solenoid valve, C1 is the first clutch, C2 is the second clutch, C3 is the third clutch, B1 is the first brake, B2 is the second brake, B3 is the third brake, B4 is the fourth brake, F1 is the first one-way clutch, F2 is the second one-way clutch, and F3 is the third one-way clutch. R represents the R-range, N the N-range, D the D-range, 1ST the 1st speed gear stage, 2ND the 2nd speed gear stage, 3RD the 3rd speed gear stage, and 4TH the 4th speed gear stage.

Moreover, symbol "O" indicates that the individual solenoids of the first solenoid valve S1, the second solenoid valve S2 and the third solenoid valve S3 are ON (or conductive), that the first clutch C1, the second clutch C2, the third clutch C3, the first brake B1, the second brake B2, the third brake B3 and the fourth brake B4 are applied, and that the first one-way clutch F1, the second one-way clutch F2 and the third one-way clutch F3 are locked. On the other hand, symbol X indicates that the individual solenoids of the first solenoid valve S1, the second solenoid valve S2 and the third solenoid valve S3 are OFF (or non-conductive), that the first clutch C1, the second clutch C2, the third clutch C3, the first brake B1, the second brake B2, the third brake B3 and the fourth brake B4 are released, and that the first one-way clutch F1, the second one-way clutch F2 and the third one-way clutch F3 are set free.

Symbol Δ indicates an element which is turned ON/OFF when a neutral control state is established, and symbol (O) indicates an element which is applied for engine braking.

At 1speed in the D-range, the first clutch C1 and the fourth brake B4 are applied, and the second one-way clutch F2 and the third one-way clutch F3 are locked. Then, the rotation of the input shaft 14 is transmitted through the first clutch C1 to the ring gear $R_2$. Since, in this state, the rotation of the ring gear $R_1$ is blocked by the second one-way clutch F2, the rotation of the carrier $CR_2$ is drastically decelerated, while idly rotating the sun gear $S_2$, and is transmitted to the counter drive gear 21.

The rotation transmitted from the counter drive gear 21 to the counter driven gear 22 is transmitted to the ring gear $R_3$. Since, however, the rotation of the sun gear $S_3$ is blocked by the fourth brake B4, the rotation of the carrier $CR_3$ is further decelerated and is transmitted to the output shaft 23.

At the 2nd speed in the D-range, on the other hand, the first clutch C1, the first brake B1, the second brake B2 and the fourth brake B4 are applied, and the first one-way clutch F1 and the third one-way clutch F3 are locked. Then, the rotation of the input shaft 14 is transmitted through the first clutch C1 to the ring gear $R_2$, but the rotation of the sun gear $S_2$ is blocked by the second brake B2 and the first one-way clutch F1. As a result, the rotation of the ring gear $R_2$ is decelerated and transmitted to the carrier $CR_2$, the rotation of which is transmitted to the counter drive gear 21 while idly rotating the ring gear $R_1$.

The rotation transmitted from the counter drive gear 21 to the counter driven gear 22 is transmitted to the ring gear $R_3$. Since, however, the rotation of the sun gear $S_3$ is blocked by the fourth brake B4, the rotation of the carrier $CR_3$ is decelerated and transmitted to the output shaft 23.

At the 3rd speed in the D-range, the first clutch C1, the third clutch C3, the first brake B1 and the second brake B2 are applied, and the first one-way clutch F1 is locked. Then, the rotation of the input shaft 14 is transmitted through the first clutch C1 to the ring gear $R_2$, and the rotation of the sun gear $S_2$ is blocked by the second brake B2 and the first one-way clutch F1. As a result, the rotation of the ring gear $R_2$ is decelerated and transmitted to the carrier $CR_2$, the rotation of which is transmitted to the counter drive gear 21 while idly rotating the ring gear $R_1$.

The rotation transmitted from the counter drive gear 21 to the counter driven gear 22 is transmitted to the ring gear $R_3$. Since, however, relative rotation between the carrier $CR_3$ and the sun gear $S_3$ is blocked by the third clutch C3, the third planetary gear unit 38 comes into its directly connected state. As a result, the rotation of the counter driven gear 22 is transmitted as is to the output shaft 23.

At the 4th speed in the D-range, the first clutch C1, the second clutch C2, the third clutch C3 and the second brake B2 are applied. Then, the rotation of the input shaft 14 is transmitted through the first clutch C1 to the ring gear $R_2$ and through the second clutch C2 to the sun gear $S_2$ so that the first and second planetary gear units 31 and 32 come into their directly connected states. As a result, the rotation of the output shaft 11 is transmitted as is to the counter drive gear 21.

The rotation transmitted from the counter driven gear 21 to the counter driven gear 22 is transmitted to the ring gear $R_3$. Since, however, relative rotation between the carrier $CR_3$ and the sun gear $S_3$ is blocked by the third clutch C3, the third planetary gear unit 38 comes into its directly connected state. As a result, the rotation of the counter driven gear 22 is transmitted as is to the output shaft 23.

The automatic transmission has a hydraulic circuit (not shown) for applying/releasing the first clutch C1, the second clutch C2, the third clutch C3, the first brake B1, the second brake B2, the third brake B3 and the fourth brake B4, and this hydraulic circuit, in turn, is controlled by a hydraulic control circuit 40. This hydraulic control circuit 40 is connected to an automatic transmission control system (i.e., ECU) 41 so that it is controlled according to the control program of the automatic transmission control system 41.

The automatic transmission control system 41 receives signals from the neutral start switch 45, an oil temperature sensor 46, an R.P.M. sensor 47, a brake switch 48, an engine R.P.M. sensor 49, a throttle opening sensor 50 and a vehicle speed sensor 51.

Thus, the shift position of the shift lever 91 (of FIG. 1), i.e., the selected range, is detected by the neutral start switch 45. The temperature of the oil in the hydraulic circuit is detected by the oil temperature sensor 46 and the R.P.M. of the input side of the first clutch C1, i.e., the R.P.M. $N_{C1}$ of the output shaft 14 (hereinafter "clutch input side R.P.M.") is detected by the R.P.M. sensor 47.

Depression of the brake pedal (not shown) is detected by the brake switch 48. The engine R.P.M. $N_E$ is detected by the engine R.P.M. sensor 49; the throttle opening θ is detected by the throttle opening sensor 50; and the vehicle speed v is detected by the vehicle speed sensor 51.

Figure 4:
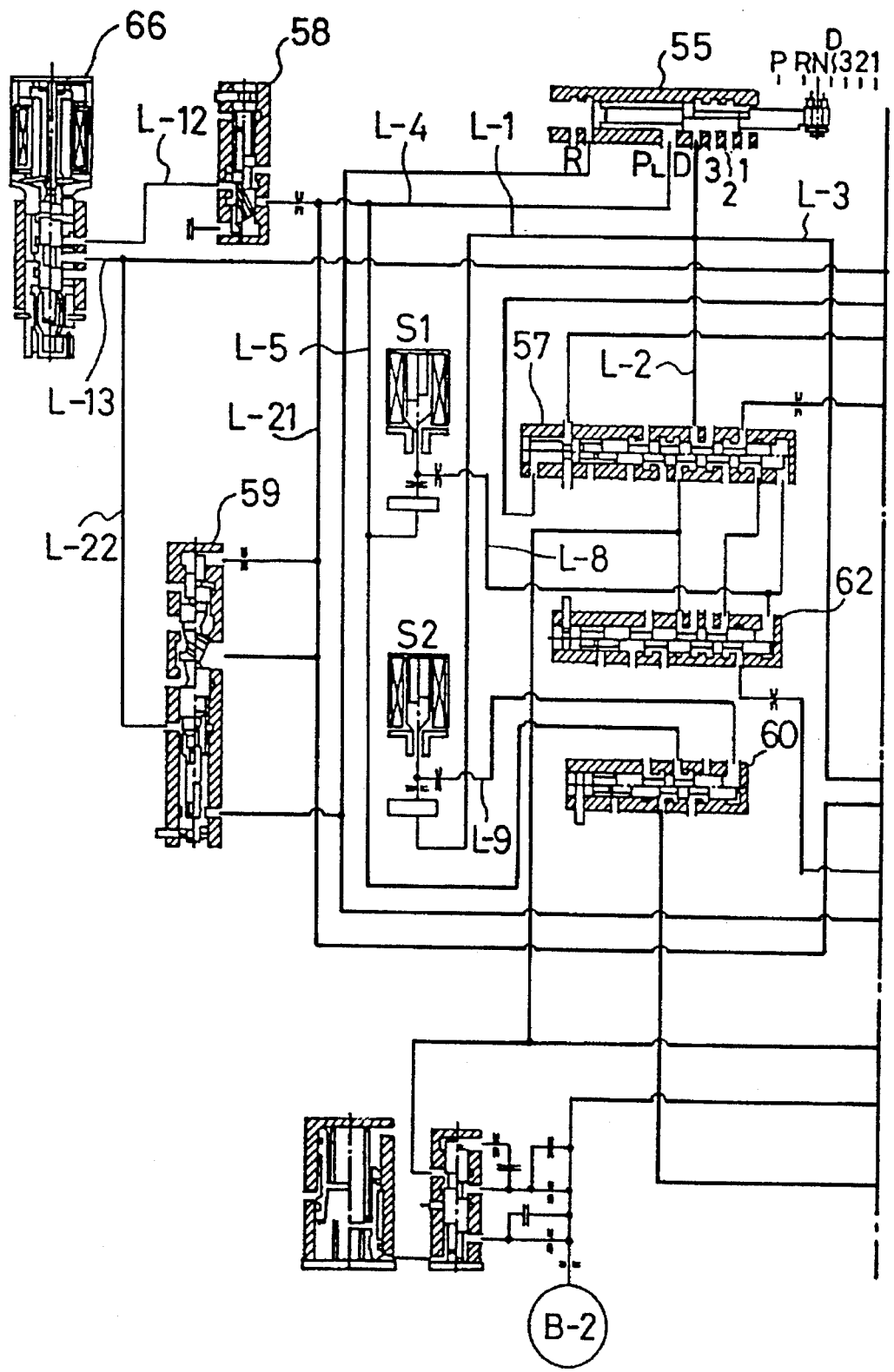
FIGS. 4 and 5 show a hydraulic circuit diagram for a control system according to an embodiment of the present invention.
Figure 5:
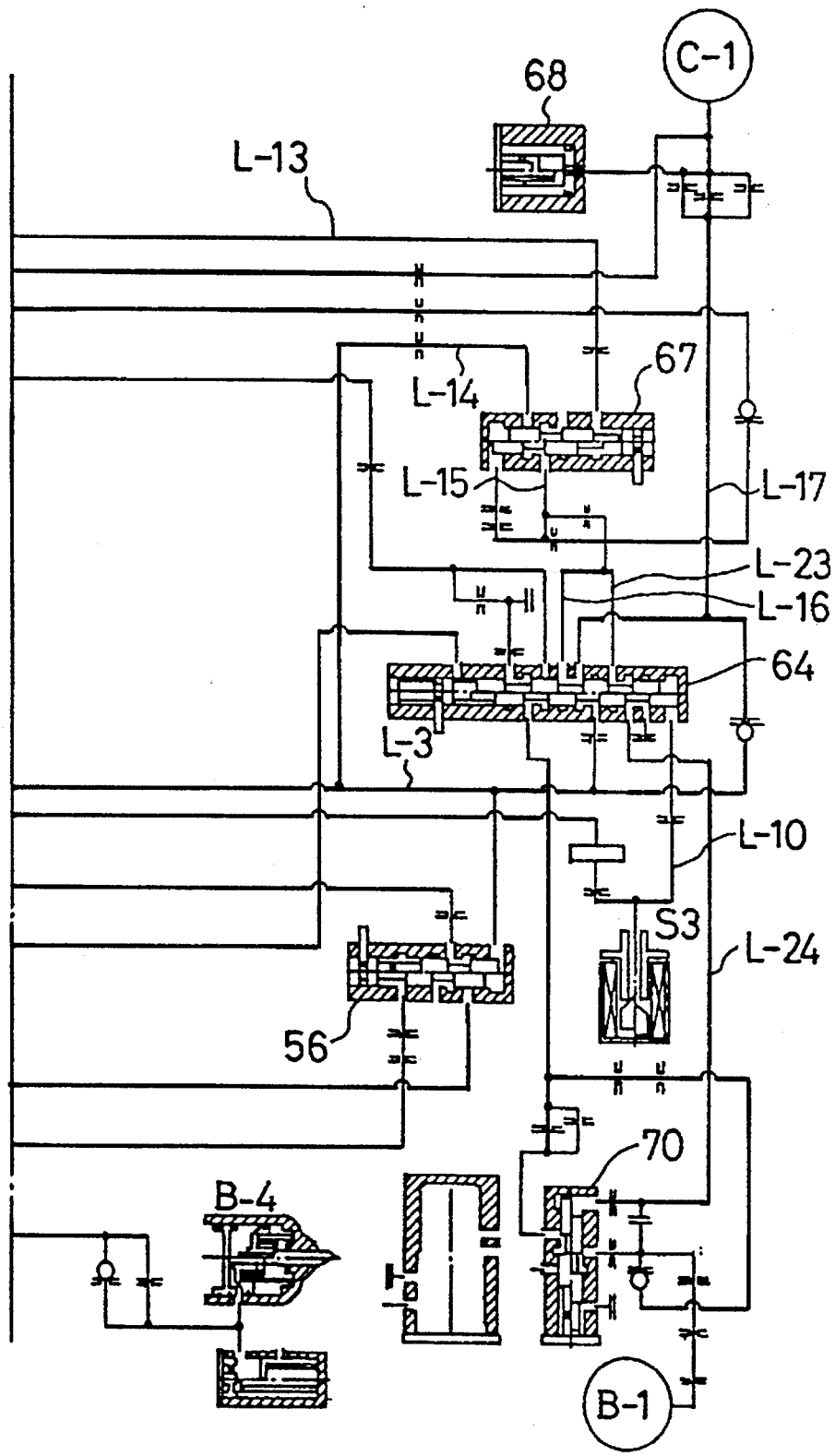

FIGS. 4 and 5 show a circuit diagram of an embodiment of the hydraulic circuit as including a primary valve 59 which regulates the oil pressure coming from the oil pressure source, e.g. sump (not shown), and outputs it as a line pressure to an oil passage L-21. A manual valve 55 is provided with ports 1, 2, 3, D, PL and R. Line pressure fed from the primary valve 59 to the port $P_L$ via the oil passages L-21 and L-4 is established as the 1st-range pressure, the 2nd-range pressure, the 3rd-range pressure, the D-range and the R-range pressure at the ports 1, 2, 3, D and R, respectively, responsive to operation of the shift lever 91 (of FIG. 1). Oil at D-range pressure exits at port D and is fed via an oil passage L-1 to the second solenoid valve S2, via an oil passage L-2 to a 1-2 shift valve 57, and via an oil passage L-3 to a B-1 sequence valve 56. On the other hand, the oil of the oil passage L-21 at line pressure from the primary valve 59 is fed to the third solenoid valve S3, via an oil passage L-4 to a solenoid modulator valve 58 and further via the oil passage L-5 to the first solenoid valve S1 and to a 2-3 shift valve 60.

The first solenoid valve S1, the second solenoid valve S2 and the third solenoid valve S3 are turned ON/OFF in response to the signals of the hydraulic control circuit 40 (of FIG. 2) so that the first solenoid valve S1 feeds a signal oil pressure via an oil passage L-8 to the 1-2 shift valve 57 and a 3-4 shift valve 62, so that the second solenoid valve S2 feeds a signal oil pressure via an oil passage L-9 to the 2-3 shift valve 60, and so that the third solenoid valve S3 feeds a signal oil pressure via an oil passage L-10 to the neutral relay valve 64.

The spool of 1-2 shift valve 57 takes the upper half position in 1st speed and the lower half position in 2nd, 3rd and 4th speeds. The spool of the 2-3 shift valve 60 takes the lower half position in the 1st and 2nd speeds and the upper half position in the 3rd and 4th speeds. The spool of the 3-4 shift valve 62 takes the upper half position in the 1st and 4th speeds and the lower half position in the 2nd and 3rd speeds. The spool of the neutral relay valve 64 takes the upper half position in the neutral control state and the lower half position in the 1st to 4th speeds.

The solenoid module valve 58 is connected via an oil passage L-12 with the linear solenoid valve 66, which is connected via an oil passage L-13 with the C-1 control valve 67. The linear solenoid valve is further connected via an oil passage L-22 with the primary valve 59.

In response to the signal from the hydraulic control circuit 40, the linear solenoid valve 66 is controlled to feed a throttle pressure $P_{TH}$ as the control oil pressure to the C-1 control valve 67. This C-1 control valve 67 is fed with the C-range pressure the via oil passages L-3 and L-14 so that it regulates the D-range pressure to a pressure $P_{C1}$ (hereinafter "C-1 oil pressure") of a hydraulic servo C-1, which corresponds to the throttle pressure $P_{TH}$ coming from the linear solenoid valve 66, and feeds the pressure $P_{C1}$ to an oil passage L-15.

As noted above, the aforementioned neutral relay valve 64 takes the upper half position in the neutral control state. In this neutral control state, therefore, the C-1 oil pressure $P_{C1}$ established in the oil passage L-15 is fed via an oil passage L-16, the neutral relay valve 64 and an oil passage L-17 to the hydraulic servo C-1. The C-1 oil pressure $P_{C1}$ is further fed via oil passages L-23 and L-24 to a B-1 control valve 70.

Moreover, the neutral relay valve 64 normally takes the lower half position in the 1to 4th speeds. As a result, in the 1st to 4th speeds, the D-range pressure oil is fed via the oil passage L-3, the neutral relay valve 64 and the oil passage L-17 to the hydraulic servo C-1. In the neutral control state, the neutral relay valve 64 is switched to the upper half position to connect the oil passage L-16 and the oil passage L-17. Incidentally, reference numeral 68 designates a damper valve which is arranged in the oil passage L-17 for damping the pulsations in the C-1 oil pressure $P_{C1}$, and characters B-1, B-2 and B-3 designate hydraulic servos of the first brake B1, the second brake B2 and the third brake B3, respectively.

In a N-D shift, the manual valve 55 is switched by the operation of the shift lever 91 to generate the D-range pressure in the oil passage L-3. Then, the D-range pressure is regulated by the C-1 control valve 67 to generate the C-1 oil pressure $P_{C1}$, and the neutral relay valve 64 is switched to feed the C-1 oil pressure $P_{C1}$ to the hydraulic servo C-1 so that the first clutch C1 can be smoothly applied.

If, at this time, the switching of the neutral relay valve 64 is delayed, the D-range pressure is temporarily fed through the neutral relay valve 64 to the hydraulic servo C-1. Since, however, the hydraulic servo C-1 is designed to have a stroke loss, no influence is exerted as a result of the feed of the D-range pressure.

If, however, the N-D switching is effected immediately after the D-N switching, the oil at the time when the D-range is selected is left in the hydraulic servo C-1 at the time of N-D switching. If, therefore, the D-range pressure is temporarily fed to the hydraulic servo C-1 due to the delay in the switching of the neutral relay valve 64, the rise of the oil pressure in the hydraulic servo C-1 is accelerated to cause a serious engaging shock.

In D-N switching, therefore, the delay means 104 starts a timer (not shown) and, at the same time, the third solenoid valve S3 is turned ON and remains ON until lapse of a time period $T_{DN}$ necessary for the oil to be drained from the hydraulic servo C-1 and the oil passage L-17. By turning on the solenoid valve S3, the neutral relay valve 64 is switched to the position for feeding the C-1 oil pressure $P_{C1}$.

Figure 6:
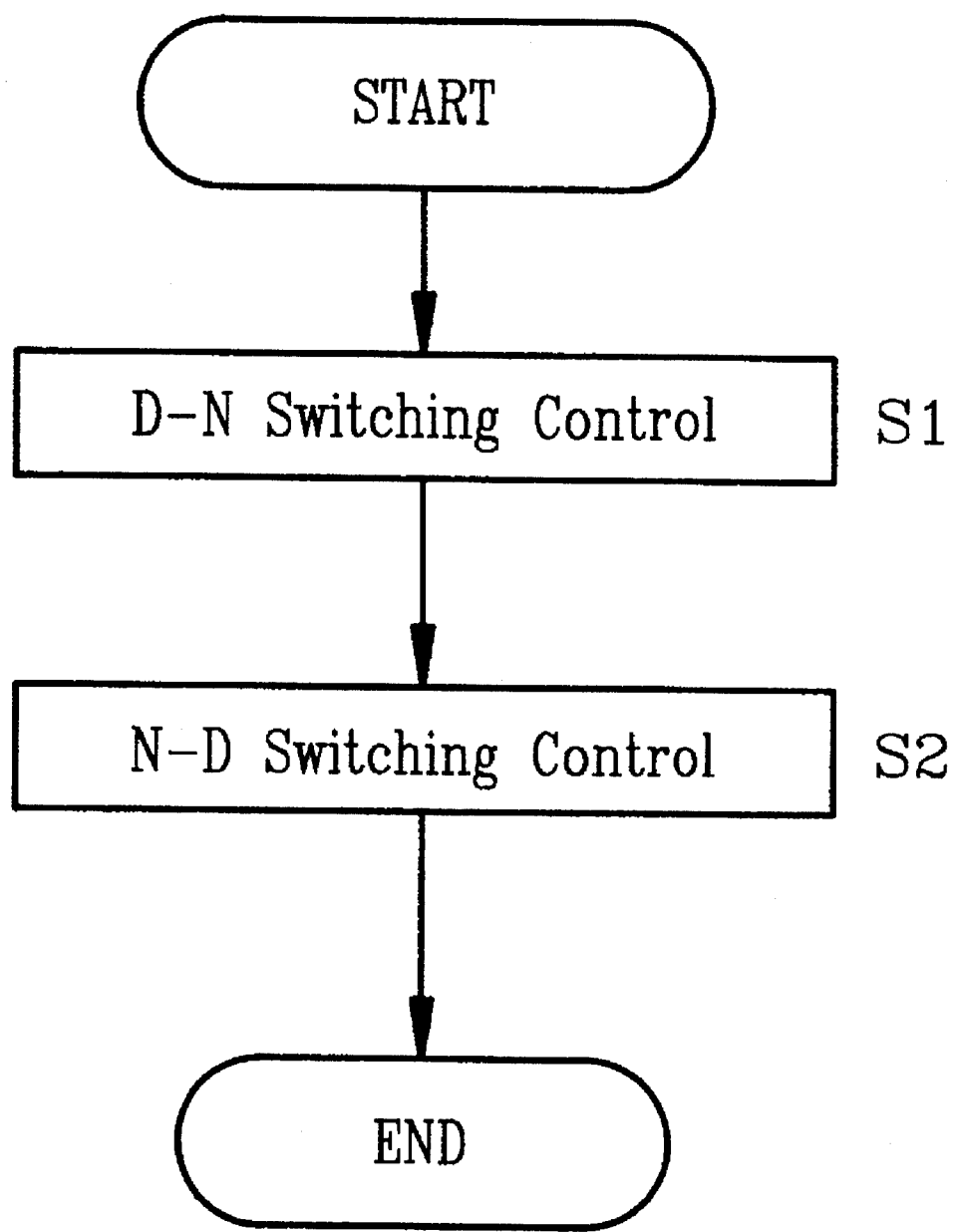
Fig. 6 is a flow chart of the main routine for controlling operations of an automatic transmission with a control system according to an embodiment of the present invention.

In FIG. 6, a flow chart of the main routine for operation of the control system according to an embodiment of the present invention:

Step S1: A control subroutine for the D-N switching is executed.

Step S2: A control subroutine for the N-D switching is executed.

Figure 7:
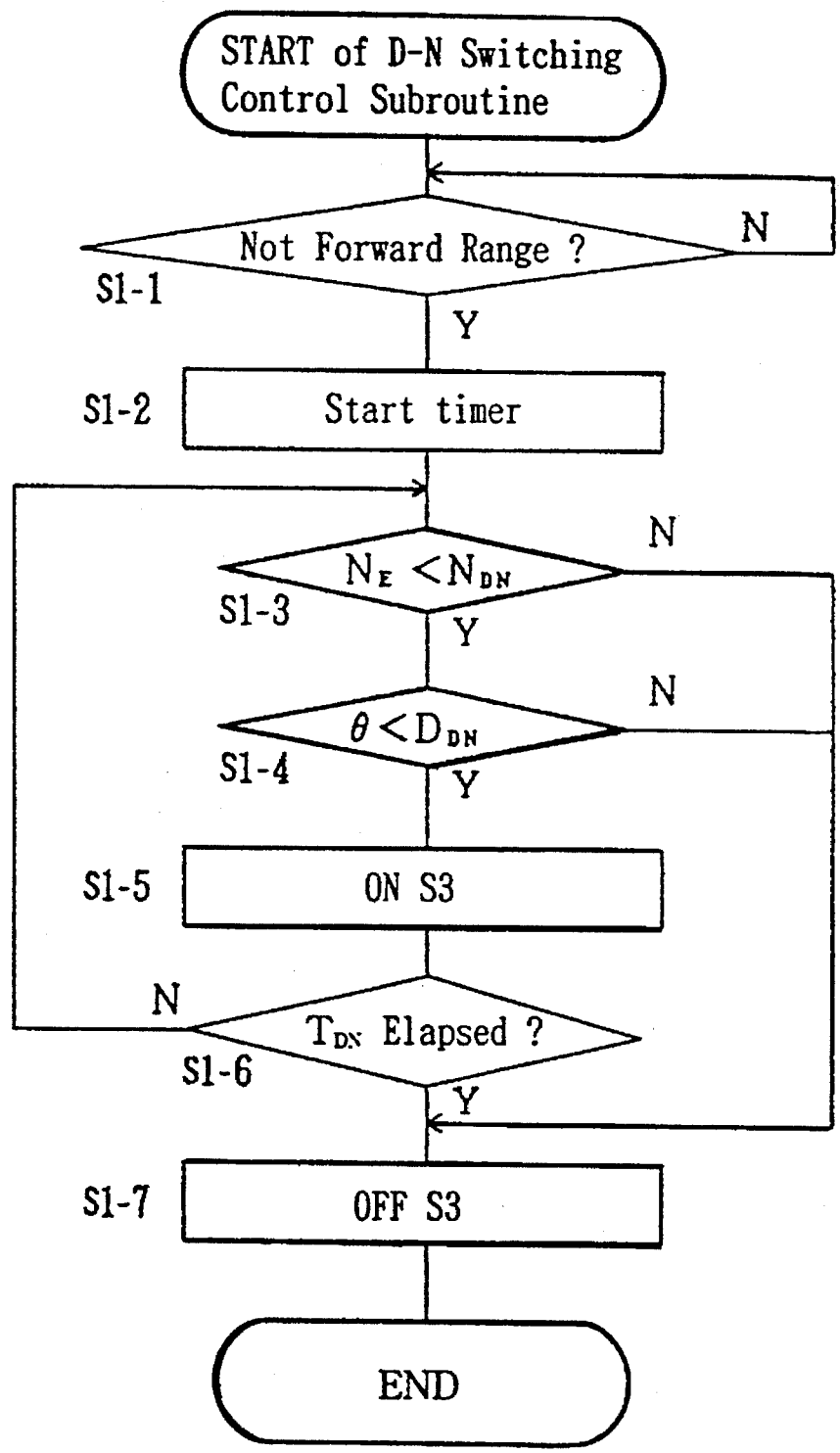
FIG. 7 is a flow chart of a D-N switching control subroutine (step S1 in FIG. 6) in an embodiment of the present invention.

FIG. 7 is a flow chart of the D-N switching subroutine (step S1 of FIG. 6) wherein:

Step S1-1: Operation of the shift lever 91 (of FIG. 1) to change to a range other than the forward range is detected. Upon detection of such a movement of the shift lever 91, the subroutine advances to Step S1-2.

Step S1-2: The timer (not shown) is started. The set time period $T_{DN}$ for ending the timing is predetermined to be the time period required for draining the oil from the hydraulic servo C-1 (of FIG. 5) of the first clutch (of FIG. 2) and from the oil passage L-17.

Step S1-3: The hydraulic servo rotation deciding means decides whether or not the engine R.P.M. $N_E$ is lower than a set value $N_{DN}$. Thus, engine R.P.M. is taken. The subroutine then advances to Step S1-4 if the answer is YES, and to Step S1-7 if NO. Thus, the delay inhibiting means inhibits the delay of the delay means 104.

The hydraulic servo C-1 is provided with a ball check valve (not shown) which is opened, by centrifugal force, when the oil pressure drops, to rapidly discharge the oil from the hydraulic servo C-1. If, therefore, the set value $N_{DN}$ is set to the R.P.M. at which the check valve is opened by centrifugal force, the R.P.M. of the hydraulic servo C-1 rises according to the engine R.P.M. $N_E$, if this value $N_E$ just after the D-N switching exceeds the set value $N_{DN}$, so that the check valve is opened. As a result, the oil in the hydraulic servo C-1 can be quickly discharged. Since, in this case, the third solenoid valve S3 need not be turned ON (or conductive), the power consumption the heat generation of the third solenoid valve S3 can be produced to prolong the service life of the third solenoid valve S3.

Step S1-4: It is decided whether or not the throttle opening θ is less than the set value $D_{DN}$. The subroutine advances to Step S1-5, if the answer is YES, and to Step S1-7 if NO.

When the accelerator pedal (not shown) is depressed after the D-N switching so that the throttle opening θ increases, the engine R.P.M. $N_E$ and the R.P.M. of the hydraulic servo C-1 accordingly rise to increase the centrifugal force. If, therefore, the value $D_{DN}$ is set to an R.P.M. at which the check valve is opened by the centrifugal force, the R.P.M. of the hydraulic servo C-1 rises according to the throttle opening θ if this opening θ after the D-N switching exceeds the set value $D_{DN}$, so that the check valve is opened. As a result, the oil in the hydraulic servo C-1 is abruptly discharged. Since, in this case, the third solenoid valve S3 need not be turned ON, its power consumption and heat generation can be reduced.

Step S1-5: The third solenoid valve S3 is turned ON. If this third solenoid valve S3 is already ON, this ON status is held. In the meanwhile, the neutral relay valve 64 can be switched to the position for feeding the C-1 oil pressure $P_{C1}$.

Step S1-6: It is decided whether or not the set time period $T_{DN}$ has elapsed. The subroutine advances to Step S1-7, if the answer is YES, and returns to Step S1-3 if NO.

Step S1-7: The solenoid valve S3 is turned OFF (or non-conductive).

Figure 8:
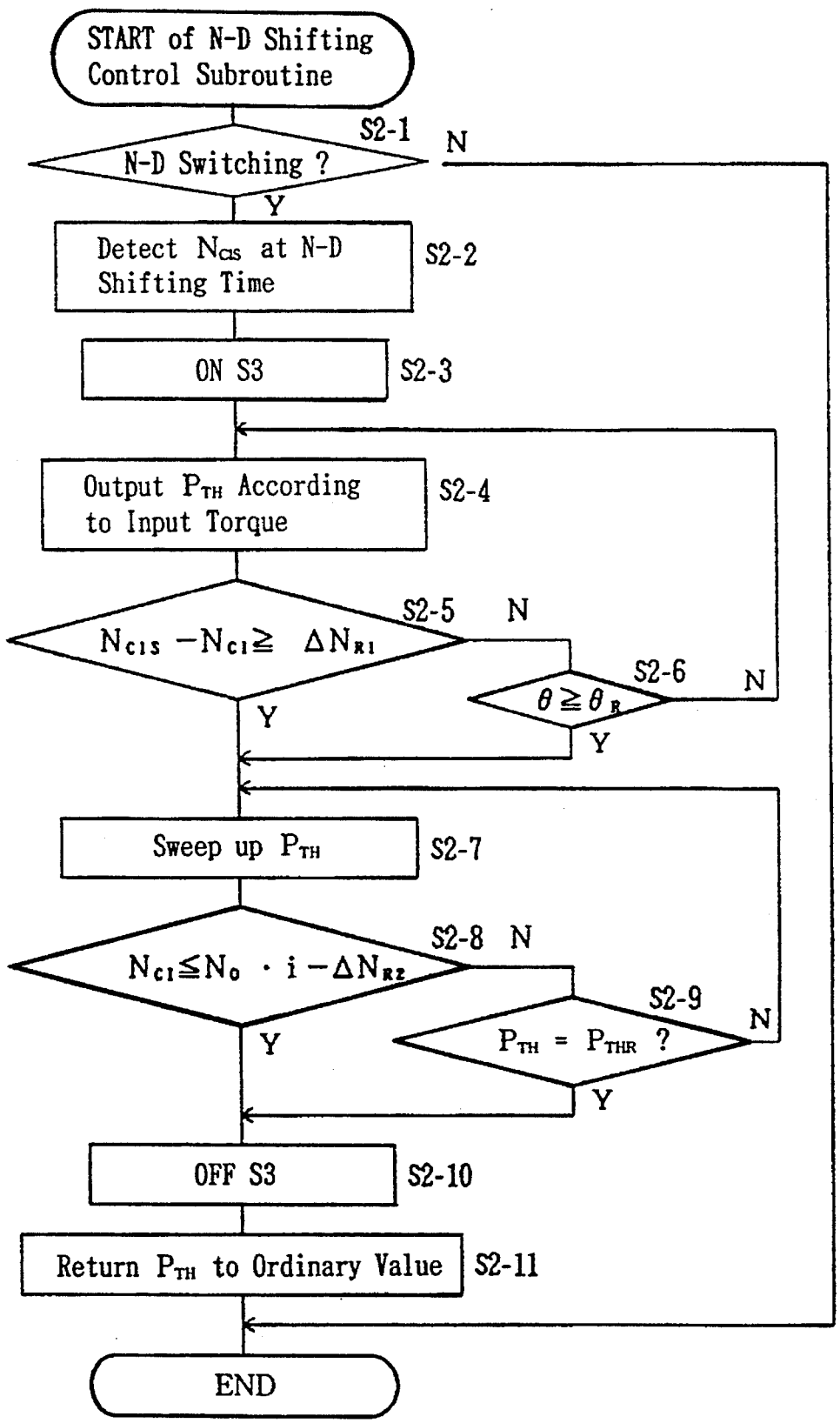
FIG. 8 a flow chart of a N-D switching control subroutine (step S2 in FIG. 6) in an embodiment of the present invention.

FIG. 8 is a flow chart for a N-D switching control subroutine (step S2 in FIG. 6) wherein:

Step S2-1: It is decided whether or not the N-D switching has been commanded on the basis of the signal coming from the neutral start switch 45 (of FIG. 1). The subroutine advances to Step S2-2, if the answer is YES, but the N-D switching control is ended if NOT.

Step S2-2: The clutch input side R.P.M. $N_{C1S}$ at the time N-D switching command is detected.

Step S2-3: The solenoid valve S3 is turned ON.

Figure 9:
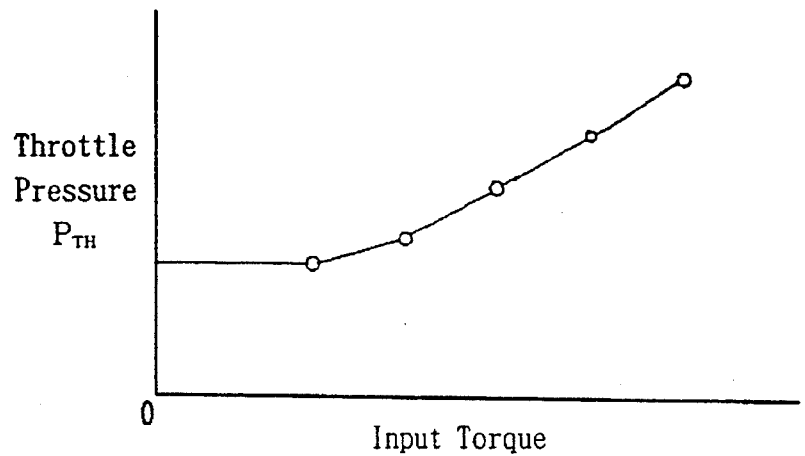
FIG. 9 is a graph of throttle pressure $P_{TH}$ against input torque for an embodiment of the control system of the present invention.
Figure 10:
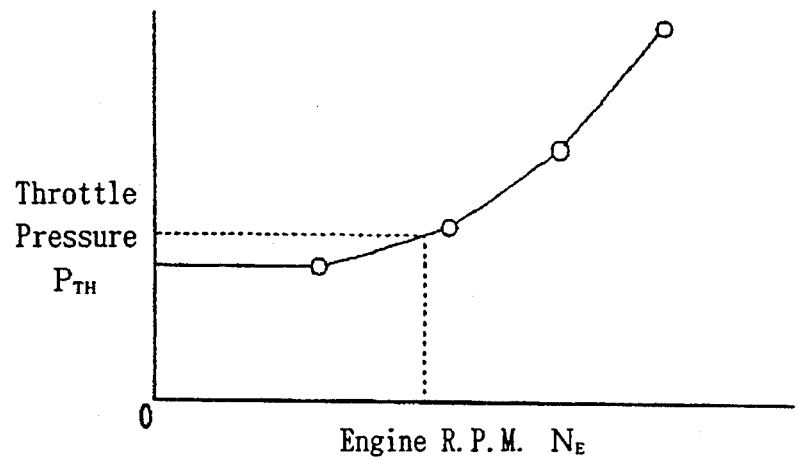
FIG. 10 is a graph of throttle $P_{TH}$ pressure against an engine R.P.M. $N_E$ for an embodiment of the control system of the present invention.
Figure 11:
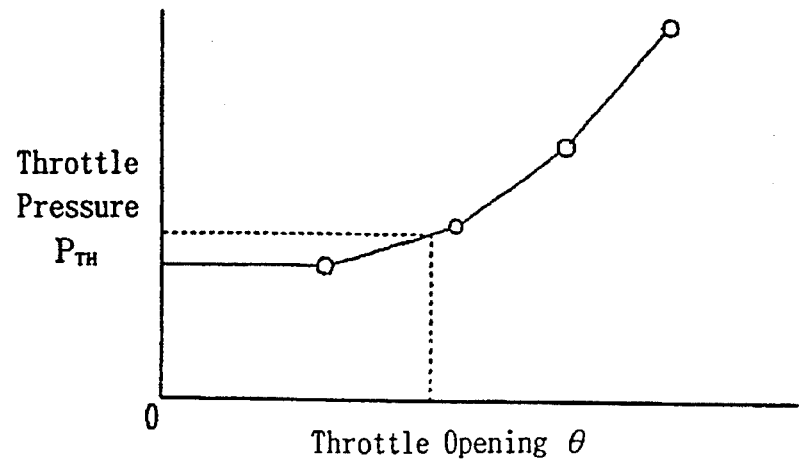
FIG. 11 is a graph of throttle pressure $P_{TH}$ against throttle opening $\theta$ for an embodiment of the control system of the present invention.

Step S2-4: With reference to the map of FIG. 9, the throttle pressure $P_{TH}$ in accordance with the input torque is output. This throttle pressure $P_{TH}$ can also be output with reference to the map of FIG. 10 at the time of idling-ON and with reference to the map of FIG. 11 at the time of idling-OFF.

Step S2-5: The clutch input side R.P.M. $N_{C1}$ at this time is detected, and it is decided whether or not the difference between the clutch input side R.P.M. $N_{C1S}$ at the N-D switching time and the clutch input side R.P.M.

$N_{C1}$ is at least a set value $\Delta N_{R1}$. The subroutine then advances to Step S2-7, if the difference ($N_{C1S}-N_{C1}$) exceeds the set value $\Delta N_{R1}$, and to Step S2-6 if NOT.

Step S2-6: It is decided whether or not the throttle opening θ is at least equal to a set value $θ_R$. The subroutine advances to Step S2-7, if the answer is YES, but returns to Step S2-4 if NOT.

The aforementioned set value $AN_{R1}$ is set to a value at the instant when the piston (not shown) of the hydraulic servo C-1 reaches the end of its stroke so that the first clutch C1 (of FIG. 2) starts its engagement (or grip), and the aforementioned set value $θ_R$ is predetermined to indicate that the driver wishes to start forward.

Before the first clutch C1 has started its engagement, as soon as the accelerator pedal (not shown) is depressed to increase the throttle opening θ, the subroutine advances to Step S2-7.

Step S2-7: The throttle pressure $P_{TH}$ is swept up. In this case, the control oil pressure from the linear solenoid valve 66 (of FIG. 4) is changed to raise the C-1 oil pressure $P_{C1}$. The C-1 oil pressure $P_{C1}$ is raised by a set pressure $\Delta P$ for each lapse of a minute time period $\Delta t$, to continue the engagement of the first clutch C1.

Step S2-8: It is decided on the basis of the output R.P.M. $N_0$ of the transmission 16 whether or not the application of the first clutch C1 has been ended. If, in this case, the gear ratio is designated as i, the R.P.M. at the output side of the first clutch C1 is assumed to be expressed by $N_0 \cdot i$. Hence, it is decided whether or not the clutch input side R.P.M. $N_{C1}$ is smaller by a set value $\Delta N_{R2}$ than the output side R.P.M. $N_0 \cdot i$, as defined by the following equation:

$$N_{C1} \leq N_0 \cdot i - \Delta N_{R2}.$$

Then, the subroutine advances to Step S2-10, if the application of the first clutch C1 is ended, and to Step S2-9 if NOT.

Step S2-9: It is decided whether or not the throttle pressure $P_{TH}$ has reached a set value $P_{THR}$. The subroutine advances to Step S2-10, if the answer is YES, but returns to Step S2-7 if NOT.

Step S2-10: The third solenoid valve S3 is turned OFF.

Step S2-11: The throttle pressure $P_{TH}$ is returned to an ordinary value for the present gear stage and the throttle opening θ.

Figure 12:
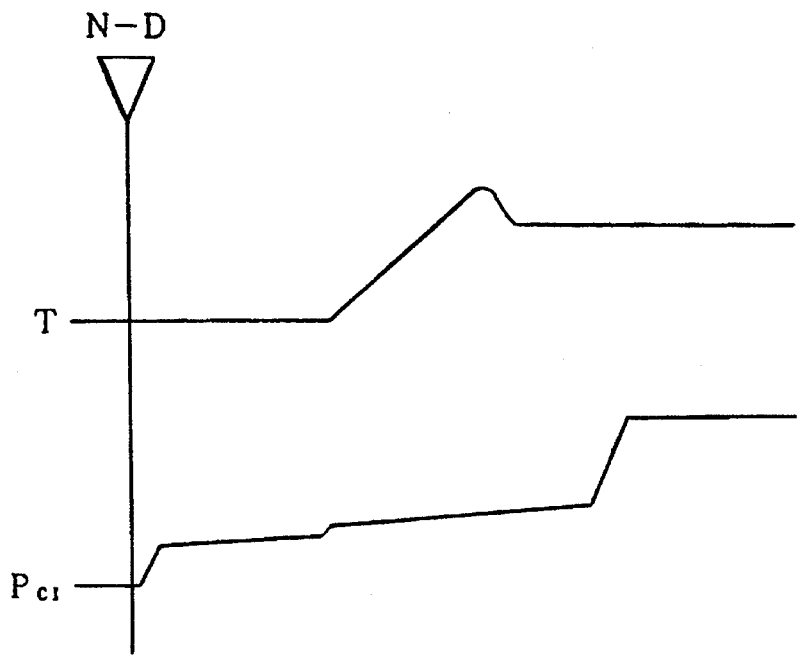
FIG. 12 is a graph of the oil pressure in the hydraulic servo and the torque versus time in a N-D shift under control of an embodiments of the present invention.
Figure 13:
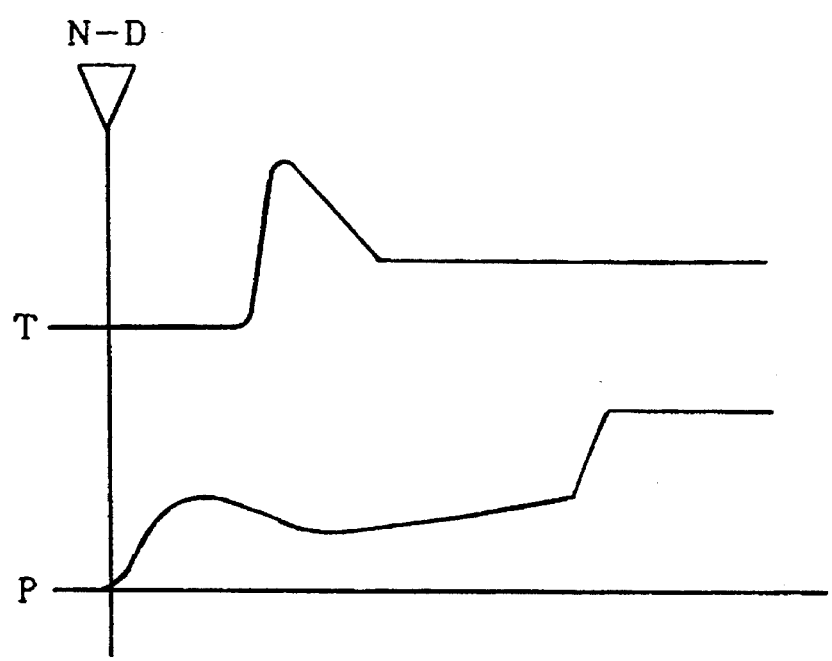
FIG. 13 is a graph of the oil pressure in the hydraulic servo and the torque versus time in a prior art control system for an automatic transmission.

Even if the N-D switching is effected immediately after the D-N switching, as seen in FIG. 12, the C-1 oil pressure $P_{C1}$ does not temporarily rise, and the torque T does not abruptly rise. As a result, it is possible to prevent the engaging shock.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A control system for an automatic transmission which receives the rotation of an engine through a fluid coupling, the transmission having a clutch, applied responsive to selection of a forward running range and released responsive to selection of neutral range, and range selecting means for selecting a range, said control system comprising:

range detecting means for detecting the selected range;

a hydraulic circuit comprising:

a hydraulic servo which receives oil pressure for applying said clutch;

a manual valve movable by operation of said range selecting means between at least a forward range position for generating a forward range oil pressure and a neutral range position;

a regulator valve for regulating said forward range oil pressure to generate a regulated oil pressure;

a solenoid valve for generating a signal oil pressure in accordance with ON/OFF signals;

a change-over valve switched in response to said signal oil pressure between a first position for feeding said forward range oil pressure to said hydraulic servo and a second position for feeding said regulated oil pressure to said hydraulic servo; and a control unit comprising delay means for outputting, responsive to detection of a switch from said forward running range to said neutral range by said range detecting means, a first signal to said solenoid valve to hold said change-over valve in said second position until lapse of a set time period, and for outputting a second signal to said solenoid valve to move said change-over valve to said first position when said set time period has elapsed.

2. A control system for an automatic transmission according to claim 1, wherein said change-over valve takes said first position when said solenoid valve is ON, and said second position when said solenoid valve is OFF.

3. A control system for an automatic transmission according to claim 1, further comprising:

hydraulic servo rotation deciding means for deciding the rotational rate of said hydraulic servo; and a check valve in said hydraulic servo; and wherein said control unit further includes delay inhibiting means for inhibiting the outputting of said first signal by said delay means if it is decided that the rotational rate of said hydraulic servo is sufficient to open said check valve.

4. A control system for an automatic transmission, according to claim 3, wherein said hydraulic servo rotation deciding means is engine R.P.M. detecting means for detecting the R.P.M. of the engine, which is taken as said rotational rate of said hydraulic servo, and wherein said delay inhibiting means inhibits the outputting of said first signal by said delay means if the engine R.P.M. detected by said engine R.P.M. detecting means is higher than a predetermined value.

5. A control system for an automatic transmission, according to claim 3, wherein said hydraulic servo rotation deciding means is throttle opening detecting means for detecting the throttle opening of the engine, said detected throttle opening being taken as a measure of said rotational rate of said hydraulic servo, and wherein said delay inhibiting means inhibits the outputting of said first signal by said delay means if the throttle opening detected by said throttle opening detecting means is higher than a predetermined value.

6. A control system for an automatic transmission, according to claim 1, wherein said hydraulic circuit further comprises a linear solenoid valve for feeding a control oil pressure to said regulator valve, said regulator valve generating said regulated oil pressure according to said control oil pressure fed from said linear solenoid valve, and wherein said control unit further outputs, responsive to detection of a switch from said neutral range to a forward running range by said range detecting means, a third signal to said linear solenoid valve to increase said regulated oil pressure in a predetermined pattern.

7. A control system for an automatic transmission, according to claim 1, wherein the set time period of said delay means is the time required for release of oil pressure from said hydraulic servo.

* * * * *